US012603439B2

(12) United States Patent
Doyle et al.

(10) Patent No.: US 12,603,439 B2
(45) Date of Patent: Apr. 14, 2026

(54) WAVEGUIDES AND WAVEGUIDE SENSORS WITH SIGNAL-IMPROVING GROOVES AND/OR SLOTS

(71) Applicant: Magna Electronics, LLC, Southfield, MI (US)

(72) Inventors: Scott B. Doyle, Sudbury, MA (US); Angelos Alexanian, Lexington, MA (US); Konstantinos Konstantinidis, Schweinfurt (DE)

(73) Assignee: Magna Electronics, LLC, Southfield, MI (US)

( * ) Notice: Subject to any disclaimer, the term of this patent is extended or adjusted under 35 U.S.C. 154(b) by 0 days.

(21) Appl. No.: 18/670,711

(22) Filed: May 21, 2024

(65) Prior Publication Data

US 2024/0313411 A1 Sep. 19, 2024

Related U.S. Application Data

(63) Continuation of application No. 17/453,649, filed on Nov. 5, 2021, now Pat. No. 12,015,201.

(51) Int. Cl.
*H01Q 13/10* (2006.01)
*H01Q 21/08* (2006.01)

(52) U.S. Cl.
CPC ............ *H01Q 13/10* (2013.01); *H01Q 21/08* (2013.01)

(58) Field of Classification Search
CPC .... H01Q 13/10; H01Q 13/18; H01Q 21/0043; H01Q 21/005; H01Q 21/06; H01Q 21/08; H01Q 21/10; H01Q 21/12; H01P 5/12
See application file for complete search history.

(56) References Cited

U.S. PATENT DOCUMENTS

| | | | | |
|---|---|---|---|---|
| 5,977,925 | A | 11/1999 | Hamnen | |
| 12,015,201 | B2 * | 6/2024 | Doyle | H01Q 1/525 |
| 2008/0224938 | A1 * | 9/2008 | Udagawa | H01Q 1/525 343/841 |
| 2011/0187614 | A1 * | 8/2011 | Kirino | G01S 7/032 333/239 |

(Continued)

FOREIGN PATENT DOCUMENTS

| | | |
|---|---|---|
| CN | 109643856 | 4/2019 |
| JP | 6686820 | 4/2020 |

OTHER PUBLICATIONS

Examination Report received from EP, Application No. 22 202 433.3-1201, dated Jan. 2, 2025 (8 pgs).

(Continued)

*Primary Examiner* — Jason M Crawford
(74) *Attorney, Agent, or Firm* — Thayne and Davis LLC; Matthew D. Thayne

(57) ABSTRACT

Waveguide and/or antenna structures for use in RADAR sensor assemblies and the like. In some embodiments, the assembly may comprise a waveguide block comprising a first surface on a first side of the waveguide block and a second surface on a second side of the waveguide block opposite the first side. One or more waveguides may be formed in the waveguide block. One or more antenna slots may be operably coupled with one or more of the waveguides. One or more auxiliary grooves may be positioned adjacent to at least one of the antenna slots and may mimic, or at least substantially mimic, at least one of the one or more antenna slots, such as in length and/or width.

13 Claims, 9 Drawing Sheets

(56) References Cited

U.S. PATENT DOCUMENTS

| | | | | |
|---|---|---|---|---|
| 2017/0279193 | A1* | 9/2017 | Chauloux | H01Q 9/28 |
| 2018/0013208 | A1* | 1/2018 | Izadian | H01Q 9/0407 |
| 2018/0241121 | A1* | 8/2018 | Mohoric | H01Q 1/288 |
| 2018/0351261 | A1* | 12/2018 | Kamo | H01Q 21/064 |
| 2020/0112077 | A1* | 4/2020 | Kamo | G01S 7/032 |
| 2020/0212594 | A1* | 7/2020 | Kirino | H01Q 21/064 |
| 2021/0247512 | A1* | 8/2021 | Alexanian | G01S 7/027 |
| 2021/0249777 | A1* | 8/2021 | Alexanian | H01Q 1/3233 |
| 2022/0094071 | A1* | 3/2022 | Doyle | G01S 13/931 |
| 2022/0244346 | A1* | 8/2022 | Shi | H01Q 21/0043 |
| 2022/0278458 | A1* | 9/2022 | Alexanian | H01Q 13/22 |
| 2022/0317289 | A1* | 10/2022 | Alexanian | H01Q 21/005 |
| 2023/0011772 | A1* | 1/2023 | Alexanian | H01Q 1/3233 |
| 2023/0036066 | A1* | 2/2023 | Bencivenni | H01Q 1/523 |
| 2023/0099058 | A1* | 3/2023 | Ikegami | H01Q 15/22 343/767 |
| 2023/0132105 | A1* | 4/2023 | Kezuka | G02F 1/2255 385/60 |
| 2023/0144495 | A1* | 5/2023 | Doyle | H01Q 1/525 343/771 |
| 2023/0194703 | A1* | 6/2023 | Doyle | G01S 7/027 342/70 |
| 2023/0253717 | A1* | 8/2023 | Petersson | H01Q 13/10 343/702 |
| 2023/0307814 | A1* | 9/2023 | Alexanian | H01P 3/121 |
| 2024/0313411 | A1* | 9/2024 | Doyle | H01Q 1/523 |
| 2025/0096475 | A1* | 3/2025 | Alexanian | H01Q 21/005 |

OTHER PUBLICATIONS

CN109643856_Machine_Translation (17 pgs).
JP6686820_Machine_Translation (26 pgs).

* cited by examiner

WAVEGUIDES AND WAVEGUIDE SENSORS WITH SIGNAL-IMPROVING GROOVES AND/OR SLOTS

CROSS-REFERENCE TO RELATED APPLICATIONS

This application is a continuation of co-pending application Ser. No. 17/453,649 filed on Nov. 5, 2021, and titled "WAVEGUIDES AND WAVEGUIDE SENSORS WITH SIGNAL-IMPROVING GROOVES AND/OR SLOTS," which is hereby incorporated herein by reference in its entirety.

SUMMARY

Disclosed herein are various embodiments of waveguide and/or antenna structures having features for altering and/or improving signal transmission and/or receiving characteristics, such as increasing signal strength within one or more particular, desired angle ranges. In preferred embodiments, such structures may be used in sensor assemblies, such as RADAR or other sensor modules for vehicles.

In some embodiments, such features may comprise grooves configured to mimic antenna slots, such as by providing an identical, substantially identical, or at least similar length, width, and/or shape. Alternatively, or additionally in some embodiments, one or more isolation grooves may be provided, such as arrays of isolation grooves that may be positioned in between adjacent antenna slots. Some embodiments may further comprise oscillating/"wavy" antenna slots having corresponding similar oscillating/wavy antenna slot grooves.

It should also be understood that any of the mimicking grooves may, in some embodiments, be replaced with slots that extend all the way through the structure into which they are formed. However, it is important to note that such slots should be distinguished from the "antenna slots" described herein in that they do not accept or direct electromagnetic radiation to or from electronics of the assembly. In other words, unlike an antenna slot, other slots or grooves disclosed herein, including but not limited to a mimicking slot extending through an antenna slot of a RADAR or other sensor assembly, is configured to alter, improve, and/or redirect signals from an antenna slot in the assembly rather than to simply accept and/or transmit signals to and/or from the electronic circuits of the assembly.

Thus, as used herein, the term "antenna slot" should be considered to encompass slots that are configured to transmit and/or receive electromagnetic signals/energy to and/or from electronics on the assembly, such as circuits on a printed circuit board of the assembly. By contrast, as used herein, an "auxiliary slot" or an "auxiliary groove" should be considered to encompass a slot or groove that facilitates a desired improvement, alternation, and/or adjustment of electromagnetic signals/energy being transmitted and/or received from an antenna slot of the same assembly, such as in some cases an adjacent antenna slot. The distinction between an "auxiliary slot" and an "auxiliary groove" is that an "auxiliary groove" may or may not extend entirely through the structure into which it is formed to form an opening, whereas an "auxiliary slot," like an antenna slot, does form such as opening.

In a more particular example of a waveguide assembly, such as a waveguide assembly and/or an antenna module for a vehicle sensor module, the assembly/module may comprise a waveguide block or other structure comprising a first surface on a first side of the waveguide block and a second surface on a second side of the waveguide block opposite the first side. One or more waveguides may be at least partially formed along the first surface of the waveguide block. The assembly may further comprise one or more antenna slots, wherein each of the one or more antenna slots is operably coupled with a waveguide of the one or more waveguides, and wherein each of the one or more antenna slots extends through the waveguide block between the first and second sides of the waveguide block. The assembly may further comprise one or more antenna grooves. The antenna groove(s) may be positioned adjacent to at least one of the one or more antenna slots. Each of the one or more antenna grooves preferably extends into the waveguide block without extending entirely through the waveguide block. The antenna groove(s) may at least substantially mimic at least one of the one or more antenna slots in both length and width.

Some embodiments may further comprise one or more antenna grooves, such as antenna isolation grooves, wherein each of the one or more antenna grooves extends into the waveguide block without extending entirely through the waveguide block. Each of the one or more antenna grooves may differ in at least one of length, width, and depth relative to each of the one or more antenna grooves. For example, the antenna grooves may be longer, narrower, and shallower than some or all of the antenna grooves in some embodiments.

In some embodiments, at least a subset of the one or more antenna grooves may vary in depth. For example, one or more arrays of antenna grooves may be provided that may vary in depth in a stepwise manner from one side of the array(s) to the other.

In some embodiments, a plurality of antenna grooves may be positioned between at least two adjacent antenna grooves of the one or more antenna grooves.

In some embodiments, each of the plurality of antenna grooves may vary in depth relative to each adjacent antenna groove of the plurality of antenna grooves.

In some embodiments, at least one of the one or more antenna slots may comprise a shifted antenna slot that is shifted in a direction at least substantially corresponding to a direction of an elongated axis of at least one of the one or more antenna slots relative to the other antenna slots of the one or more antenna slots. In some such embodiments, at least a subset of the one or more antenna grooves may be greater in length than each of the one or more antenna slots. A first subset of the one or more antenna slots may be at least substantially aligned with a first end of the at least a subset of the one or more antenna grooves. In some such embodiments, the shifted antenna slot may be at least substantially aligned with a second end of the at least a subset of the one or more antenna grooves opposite the first end.

In another specific example of an antenna assembly according to some embodiments, the antenna assembly may comprise a waveguide and an antenna structure operably coupled with the waveguide. The antenna structure may comprise an antenna slot array comprising one or more antenna slots extending between opposing surfaces of a unitary structure of the antenna assembly, such as a waveguide and/or antenna block of the assembly. A first antenna groove may be positioned at a first end of the antenna slot array, wherein the first antenna groove extends into the unitary structure without extending entirely through the unitary structure. An antenna groove array, such as an antenna isolation groove array, may also be provided, which may comprise one or more antenna grooves, wherein each antenna groove of the antenna groove array differs in at least one of length and width relative to the first antenna groove.

In some embodiments, the antenna slot array may comprise a plurality of antenna slots and the antenna groove array may comprise a plurality of antenna grooves. In some such embodiments, at least one antenna groove may be positioned between each adjacent antenna slot of the antenna slot array.

In some embodiments, each antenna groove of the antenna groove array may extend into the unitary structure without extending entirely through the unitary structure.

The antenna assembly may comprise a transmit or TX portion and a receive or RX portion, wherein the transmit portion is configured to transmit electromagnetic signals therethrough, and wherein the receive portion is configured to receive electromagnetic signals therethrough. In some such embodiments, the antenna slot array may be positioned on the transmit portion. A second antenna slot array may be positioned on the receive portion, wherein a plurality of antenna grooves is positioned between each adjacent antenna slot of the second antenna slot array.

In some embodiments, a single antenna groove may be positioned between each adjacent antenna slot of the antenna slot array.

In another specific example of an antenna assembly, the assembly may comprise a first antenna array comprising one or more elongated antenna slots each extending along an elongated axis, wherein each elongated antenna slot of the first antenna array is positioned and configured to deliver electromagnetic radiation therethrough. Each elongated antenna slot of at least a subset of the one or more elongated antenna slots of the first antenna array may be intermittently oscillate on opposite sides of its respective elongated axis along at least a portion of its respective elongated axis. An elongated groove may be positioned adjacent to at least one of the one or more elongated slots and may extend along an elongated axis. The elongated groove may intermittently oscillate on opposite sides of its elongated axis along at least a portion of its elongated axis.

Some embodiments may further comprise one or more waveguides each extending along a respective elongated axis, wherein each waveguide of the one or more waveguides is operably coupled with a respective elongated antenna slot of the first antenna array.

In some embodiments, the elongated groove (or a similar elongated slot) may at least substantially mimic at least one of the one or more elongated antenna slots in shape (and/or in length and/or width). In some such embodiments, the elongated groove may at least substantially mimic each of the one or more elongated antenna slots in shape (and/or in length and/or width). In some such embodiments, the elongated groove may at least substantially mimic at least one of the one or more elongated antenna slots in length, width, and shape.

In some embodiments, the elongated groove may extend into a structure defining both the elongated groove and the first antenna array, such as an antenna block, without extending entirely through the structure.

In some embodiments, the first antenna array may comprise a plurality of elongated antenna slots. In some such embodiments, an elongated groove may be positioned at each of two opposing ends of the first antenna array.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
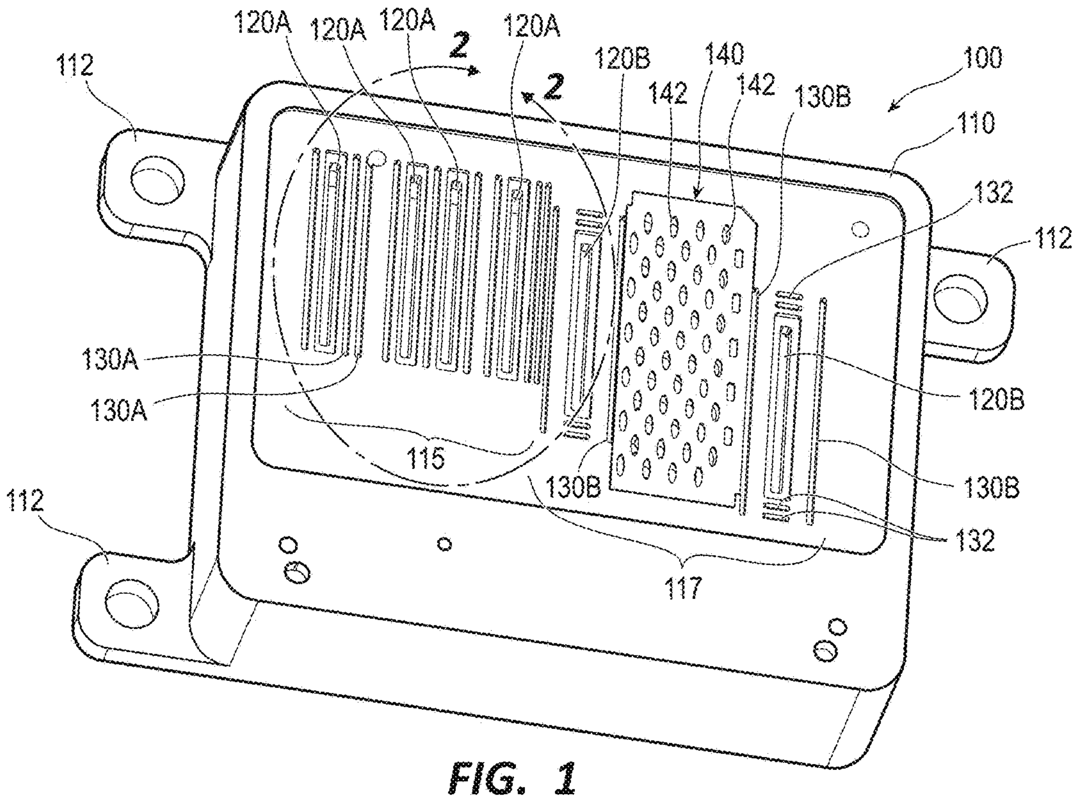
FIG. 1 is a perspective view of an antenna module according to some embodiments.

It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure but is merely representative of possible embodiments of the disclosure. In some cases, well-known structures, materials, or operations are not shown or described in detail.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 depicts an antenna and/or waveguide assembly 100 that defines, either in whole or in part, one or more waveguides therein and may comprise a portion of, for example, an antenna module, which antenna module may comprise one or more antennae. Waveguide/antenna/sensor assembly 100 may therefore be incorporated into or otherwise used with a vehicle sensor, such as a RADAR sensor assembly, according to some embodiments.

As depicted in FIG. 1, assembly 100 comprises a portion, such as a layer, casting, and/or block, that comprises and/or defines a series of antenna slots and/or grooves that are configured to transmit, receive, and/or alter electromagnetic signals. In the depicted embodiment, a body 110 containing such slots/grooves is depicted having a series of mounting tabs 112 protruding therefrom. Any of the various slots, grooves, waveguides, or other structures and/or features described herein may be formed directly into the body 110, such as by way of a die cast mold or the like, or may be formed into one or more layers or other structures coupled to body 110.

In the depicted embodiment, assembly 100 comprises a receiving or "RX" section 115 and an adjacent transmission or "TX" section 117. RX section 115 comprises a series of elongated slots, each of which is positioned and configured to receive electromagnetic radiation therethrough and may therefore be considered an example of an "antenna structure" of assembly 100. It should be understood, however, that one or more slots or another antenna structure may be, in alternative embodiments, formed in another portion of the assembly/module and/or formed in an alternative manner. For example, in some embodiments, a slot may be formed within a lid/plate or other separate layer, which may be coupled to one or more adjacent waveguides rather than incorporating the waveguides into the same, unitary structure defining the antenna slots, as is the case with preferred embodiments disclosed herein.

RX section 115 of assembly 100 comprises four elongated antenna slots 120A, each of which is spaced apart from one or more adjacent slots 120A and, as discussed in greater detail below, has various other functional features spaced in between and/or otherwise throughout section 115. More particularly, a series of antenna grooves 130A are formed adjacent to the aforementioned antenna slots 120A of RX section 115.

Antenna grooves 130A extend parallel, or in other embodiments at least substantially parallel, to antenna slots 120A. Moreover, unlike antenna slots 120A, which extend all the way through the structure of assembly 100 in which they are formed, such as a waveguide and/or antenna block or a layer of assembly 100, antenna grooves 130A extend into this structure without extending entirely through the structure (hence, the use of the term "groove" rather than "slot"). However, as previously mentioned, in some embodiments, structures intended to alter one or more aspects of an electromagnetic signal in an antenna slot may also comprise a slot. Such slots are referred to herein as "auxiliary slots."

Each antenna groove 130A also at least substantially mimics one or more (in the depicted embodiment, all) of the antenna slots 120A in length. As discussed in connection with other embodiments below, some antenna grooves are configured to mimic, or at least substantially mimic, one or more of the antenna slots 120A in both length and width. However, antenna grooves 130A of assembly 100 only mimic or resemble antenna slots 120A in length and are primarily configured to isolate the antenna grooves 130A from their surroundings, which may be useful in reducing bearing errors and narrowing the antenna pattern to reduce the field of view. Thus, antenna grooves 130A may be referred to herein as "antenna isolation grooves."

TX section 117 of assembly 100 comprises antenna slots 120B at opposing ends of the section 117 and further comprises a high-gain, squinted antenna 140 in between these opposing antenna slots 120B. Antenna 140 comprises an array of radiating slots 142 formed in a portion, such as a top layer, thereof. In the depicted embodiment, this array is formed into parallel columns that are offset from one another. Thus, a first column, such as the column shown on the left side of antenna 140, may comprise slots 142 that are positioned adjacent to spaces in between adjacent slots 142 in the adjacent column. The pattern of alternative/offset columns may repeat throughout the array such that, as shown in FIG. 1, slots 142 from the array in a column with an intermediate column therebetween may be aligned with the slots from the column, and so on. However, it is contemplated that, in other embodiments, the array of slots 142 may comprise columns and/or rows that are aligned with one another rather than offset with respect to adjacent columns and/or rows.

Although not shown in FIG. 1, it is contemplated that antenna 140 may comprise various waveguides or other features that may be present below the layer shown in FIG. 1. For example, each of the antenna slots may comprise an associated waveguide, which may comprise a "trench-like" waveguide defined by solid opposing sidewalls or, as discussed later, may comprise a waveguide formed by rows of adjacent posts forming a waveguide therebetween. In embodiments in which waveguides are formed by rows of posts, two rows of posts may form a waveguide therebetween or, alternatively, multiple rows of adjacent posts may be positioned on either side of the waveguide defined therebetween.

Similarly, with respect to antenna 140, a waveguide may be formed thereunder to feed the array of radiating slots 142. In some embodiments, this waveguide may comprise a self-contained, feed waveguide, which may be formed within a tunnel formed within a body or other portion of the antenna 140. A series of feed slots may also be formed along this waveguide to allow electromagnetic energy to be introduced from the waveguide into another waveguide, such as a parallel plate waveguide formed between upper surface of the antenna 140 and a lower surface of, for example, a cover, which may comprise the layer visible in FIG. 1. These feed slots may be arranged in a straight line and preferably extend along the tunnel waveguide at a position near, but not precisely along, the center of the waveguide.

In addition, in some embodiments, an array of protrusions may be formed within the underlying structure of antenna 140. In some such embodiments, like slots 142, these protrusions may be formed in an array having offset columns. In preferred embodiments, these protrusions may also have one or more parameters that correlate with slots 142. For example, the protrusions may have the same shape, a substantially identical shape, or at least a similar shape as slots 142. Preferably, however, one or both of slots 142 and the underlying protrusion may be elongated in one direction to provide an identifiable elongated axis. Thus, it may be preferred to avoid circular shapes, for example.

It may also be preferred that the protrusions have the same or a similar size with respect to the slots 142. Thus, although it may be preferred that they have the same, or at least substantially the same size (within about +15% of one or more dimensions such as length, width, and/or area/footprint). However, it is contemplated that, in some embodiments, one or more of the length, width, and area of the protrusions may be between about 50% and about 150% of the corresponding length, width, and/or area of the slots 142.

As another preferred matching parameter, preferably, most or all of protrusions are positioned directly, or at least substantially directly, under a corresponding slot 142. However, it is contemplated that, in some embodiments, the positioning of each protrusion may be shifted slightly (preferably less than about 0.5 mm in automotive applications; for other applications, such as applications using radiation at a frequency of around 30 GHZ, for example, the shifting may be 1 mm or more) relative to one or more (in some cases, each) corresponding slot 142. In addition, although it may be preferred to have an equal number of protrusions as slots 142, it is contemplated that some protrusions may be omitted. Moreover, in some embodiments, protrusions may be omitted altogether. However, when present, preferably sufficient numbers of protrusions are formed such that there is an equal number of columns and/or rows of protrusions as columns and/or rows of slots 142.

Preferably, when present, protrusions are between about 0.1 mm and about 0.4 mm in height for automotive applications operating in the frequency range of 76-81 GHz. However, as those of ordinary skill in the art will appreciate, the height of the protrusions may vary in accordance with the frequency of the electromagnetic radiation being used. The height used may also vary depending upon the desired use of the antenna, since the height of the protrusions may be used as a parameter to control the amplitude and/or phase of the excitation of the radiating slots 142 and/or may be used to direct a squint of a main lobe of the antenna, the shape of the main lobe, and/or the level of side lobes and/or the grating lobe. The preferred sizes of the protrusions may be identified using 3-D simulation software, such as HFSS, and may be selected among results of various simulations or using an optimization procedure.

The desired sizes of the radiating slots 142 of squinted antenna 140 may be found using, for example, 3-D simulation software. Although the locations of the slots 142 are preferably synchronized with the locations of the protrusions such that they are aligned with one another, the slot-to-slot distance (as well as the protrusion-to-protrusion distance) is preferably constant (although may be non-uniform in other contemplated embodiments, which may provide for another degree of freedom to shape the desired radiation pattern) and may vary from about one-fourth to about a full wavelength of the parallel-plate waveguide wavelength. This distance may effectively impact the squint angle and may therefore be a prime design parameter determining the squint value. The slot-to-slot distance (as well as the protrusion-to-protrusion distance) in a perpendicular direction is also preferably constant and may be, for example, about a half wavelength of the wave propagating in the internal, tunnel waveguide mentioned above.

In the depicted embodiments, the number of feed slots from the tunnel waveguide is equal to the number of columns of protrusions and/or the number of columns of radiating slots 142. However, as will be apparent from a review of all embodiments disclosed herein, this need not be the case for all contemplated embodiments. In addition, the size/footprint of feed slots may be identical, or at least substantially identical, to that of the protrusions and/or radiating slots 142, but this need not always be the case either.

For some applications, it may also be preferred that the tunnel/internal waveguide is positioned adjacent to a peripheral edge of antenna 140 rather than at or near the center. Although there are embodiments contemplated in which this internal waveguide is not positioned adjacent to an outer edge of antenna 140, it is thought that some of the parameters of assembly 100 may need to be adjusted if this modification is made.

It may also be preferred to have all of the protrusions and/or radiating slots 142 positioned on one side of the feed slots from the internal/tunnel waveguide. However, it is contemplated that, in some embodiments, one or more protrusions and/or radiating slots 142 may instead be positioned on the opposite side of these feed slots and/or the internal/tunnel waveguide. However, it is preferably that at least most of the radiating slots 142 and, when present, protrusions, are positioned on one side of the internal/tunnel waveguide and/or feed slots, which may be facilitated by placement of the internal/tunnel waveguide adjacent to a peripheral edge, as previously mentioned. Thus, in preferred embodiments, at least 90% of the radiating slots 142 and/or protrusions are positioned on just one side of the internal and/or tunnel waveguide and/or feed slots.

Further details regarding squinted antenna assemblies, which may be used to create various alternative embodiments of antenna 140, can be found in U.S. patent application Ser. No. 17/206,599 titled PARALLEL PLATE SLOT ARRAY ANTENNA WITH DEFINED BEAM SQUINT, which was filed on Mar. 19, 2021, and which is incorporated herein by reference in its entirety.

Various grooves, all of which may be considered isolation grooves in the depicted embodiment, are also shown formed along TX section 117. Thus, a single groove 130B is positioned on opposing ends of section 117. In addition, another isolation single groove 130B is positioned immediately adjacent to antenna 140 on opposing sides thereof. Thus, an isolation groove 130B is positioned on either side of each antenna slot 120B, and on either side of high-gain, squinted antenna 140. Additional isolation grooves 132 are formed at each opposing end of each antenna slot 120B that extend perpendicular, or at least substantially perpendicular in alternative embodiments, to antenna slots 120B.

By providing two distinct types of TX antennae, the possibility of providing for two distinct TX modes in an associated sensor assembly may be provided. Thus, for example, high-gain, squinted antenna 140 may be used for long-range detection, which may be particularly useful for positioning in the front region of a vehicle. The particular squint may be selected by altering various parameters in order to direct the beam in a desired direction. A second mode may be associated with use of the wide antenna slots 120B on either side of the squinted-beam antenna 140.

Figure 2:
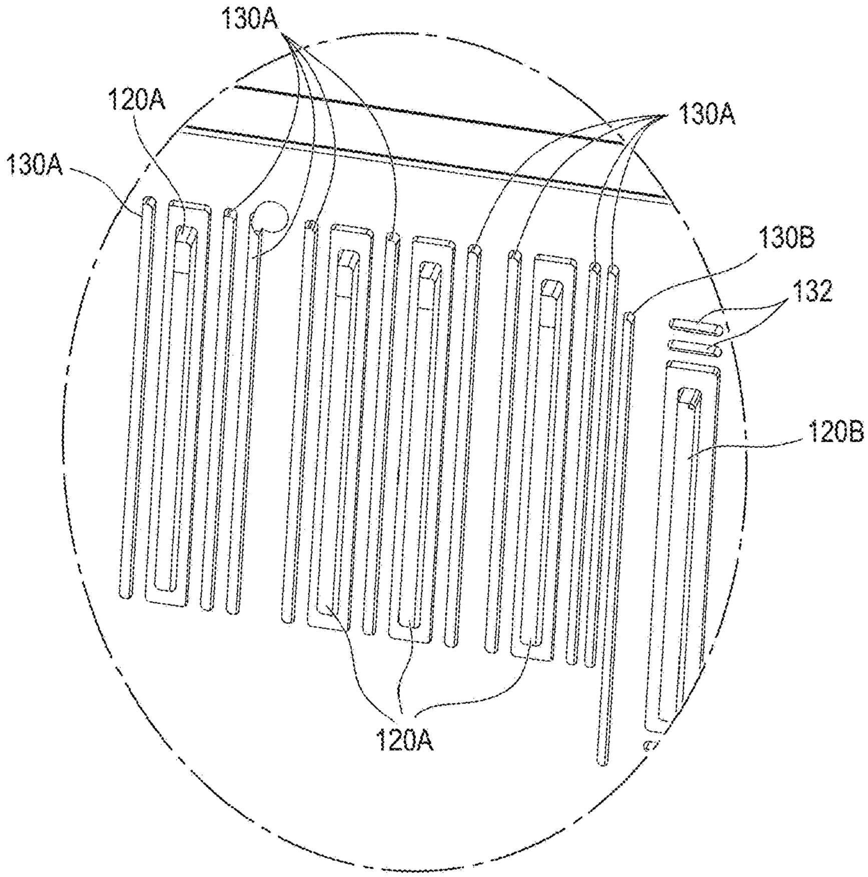
FIG. 2 is a close-up view of an RX section of the antenna module of FIG. 1.

As shown in the close-up view of FIG. 2, multiple isolation grooves 130A may be positioned between some or, in other contemplated embodiments, all adjacent antenna slots 120A. Thus, in the depicted embodiment, a single isolation groove 130A may be positioned at a first end of RX section 115 and a pair of isolation grooves 130A may be positioned at the opposite end adjacent to the TX section 117, which may reduce coupling between the TX section 117 and the RX section 115, which can improve the signal-to-noise ratio and/or improve range. In addition, a single isolation groove 130A is positioned between the two center antenna slots 120A, but multiple isolation grooves 130A are positioned between these antenna slots 120A and the outermost antenna slots 120 of RX section 115. This may be helpful in reducing overall coupling/interaction between adjacent antennae, which can, for example, improve bearing estimations.

In some embodiments, the isolation grooves 130A and/or 130B may be between about 0.4 mm and about 1.0 mm wide and may be between about 0.7 mm and about 1.0 mm deep. In a particular, preferred embodiment, the isolation grooves may be about 0.5 mm wide and about 0.75 mm deep.

Of course, as those of ordinary skill in the art will appreciate, a wide variety of alternative options are possible. For example, multiple isolation grooves and/or auxiliary slots may be positioned between each adjacent antenna and/or antenna slot if desired. Similarly, different numbers of isolation grooves and/or antenna slots may be used as desired. These specifications may be determined by the groove width and spacing and/or by the space available between antennae.

Figure 3:
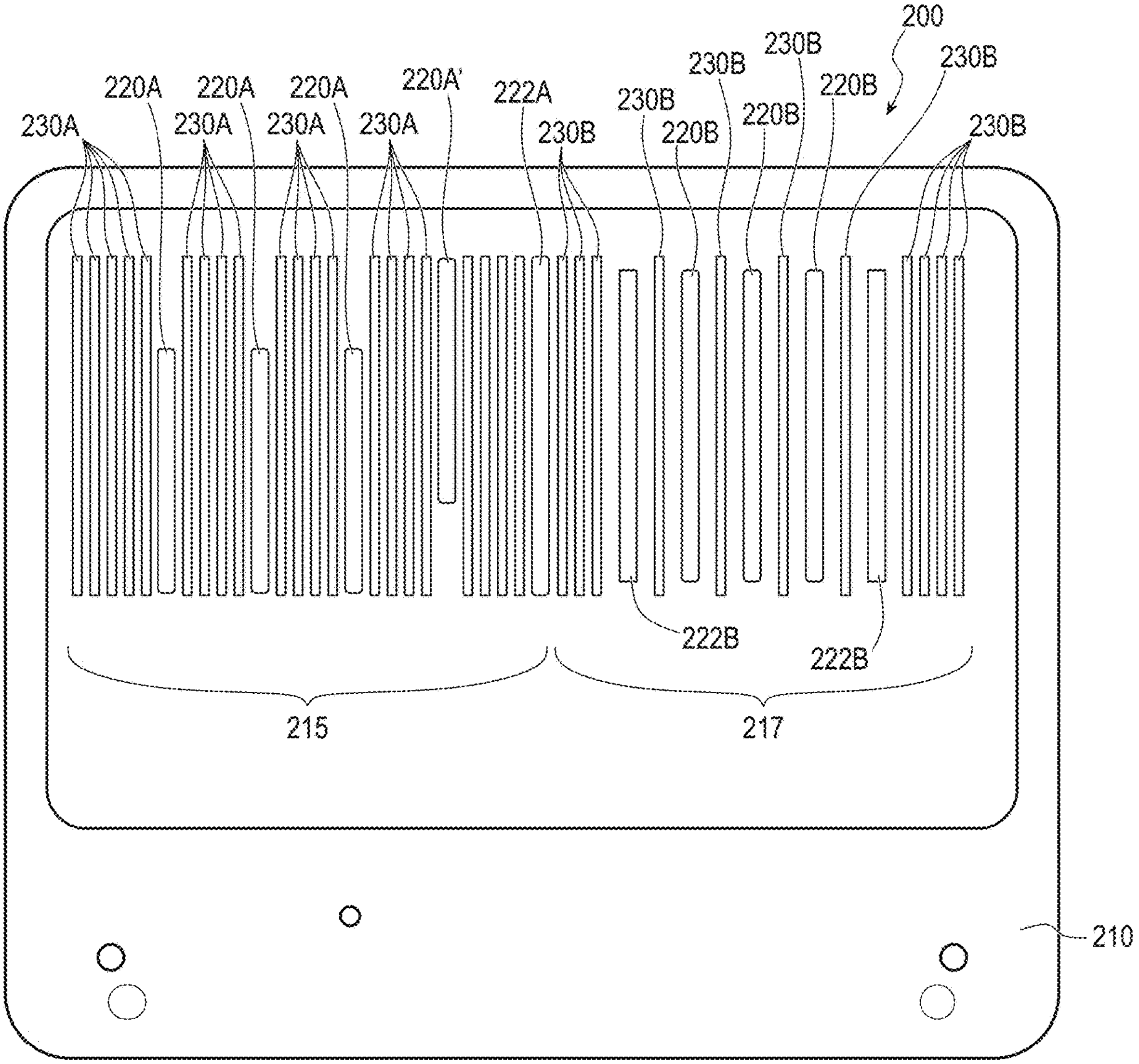
FIG. 3 is a plan view of an antenna module according to other embodiments.

FIG. 3 depicts an alternative embodiment of a waveguide/antenna/sensor assembly 200. Assembly 200 comprises various antenna slots and grooves, as previously mentioned. In addition, assembly 200 further comprises one or more antenna grooves, wherein each of the one or more antenna grooves is positioned adjacent to at least one of the one or more antenna slots, wherein each of the one or more antenna grooves that are designed to resemble one or more of the antenna slots but without extending all the way through the structure in which they are formed similar to the antenna slots.

More particularly, assembly 200 comprises a body 210, which may comprise a casting, layer, or the like. Assembly 200 further comprises an RX section 215 and a TX section 217. RX section 215 comprises four antenna slots 220A. Each of the four antenna slots 220A has essentially the same shape—i.e., the same length and width. However, three of the antenna slots 220A are aligned with one another—i.e., they begin and end at the same points along the structure into which they are formed—and the last of the antenna slots (220A') is shifted vertically. Vertically shifted antennae may be used to calculate elevation bearing.

An array of isolation grooves 230A is positioned adjacent to each antenna slot 220A and in between each pair of adjacent antenna slots 220A. In the depicted embodiment, five isolation grooves 230A are positioned on the outer edge of RX section 215, after which four isolation grooves 230A are positioned in between each pair of adjacent antenna slots 220A thereafter. As those of ordinary skill in the art will appreciate, the number of isolation grooves 230A used may vary according to the desired results but, as shown in the depicted embodiment, a larger number of isolation grooves 230A may be used in portions of the assembly 200 that delimit or are adjacent to boundaries, such as exterior boundaries of the assembly 200 and/or boundaries between different functional portions of the assembly 200.

It is also worth noting that the isolation grooves 230A are substantially longer and thinner than the antenna slots 220A. Moreover, the first three (from the perspective of FIG. 3 starting at the left side of the figure) antenna slots 220A are aligned with the lower ends of the adjacent array(s) of isolation grooves 230A and the fourth antenna slot 220A' is aligned with the upper end of the adjacent arrays of isolation grooves 230A.

Grooves 230A arranged into relatively dense arrays, as shown in FIG. 3, may be useful to help isolate the adjacent antennae from one another and/or improve bearing estimation for both azimuth and elevation. These grooves may also be configured to reduce ripple in azimuth patterns. In some embodiments, isolation grooves 230A may be between about 0.4 mm and about 1.0 mm wide and may be between about 0.7 mm and about 1.0 mm deep. In a particular, preferred embodiment, the isolation grooves may be about 0.5 mm wide and about 0.75 mm deep.

Although from the plan view of FIG. 3, groove 222A appears similar to antenna slots 220A and 220A', it should be understood that, unlike these antenna slots 220A and 220A', groove 222A does not form an opening that extends all the way through the structure/layer into which each of these features is formed. Thus, this groove 222A should be considered to resemble or mimic the antenna slots 220A and 220A' without actually comprising a slot. Groove 222A may therefore be considered a "fake" or "parasitic" slot, which may, in some cases along with the aforementioned isolation grooves, be used to better match the shifted antenna slot 220A' to its adjacent antenna slot 220A. The term "parasitic" antenna may be used to indicate the positioning of these grooves next to functional antennas, such as at the end of an antenna array, so that the last (and first) antenna on the array "sees" similar surroundings relative to the antenna in the middle of the array. In this manner, the edge antennas may be able to achieve similar performance with the rest of the antennas in the array.

However, again, it should be understood that, in alternative embodiments, groove 222A may instead extend all of the way through the structure/layer into which it is formed and may therefore be considered an "auxiliary slot" that may have the same or a similar purpose.

In addition, comparing detections received from the shifted antenna slot 220A' to detections from other antenna slots 220A, such as the antenna slot 220A adjacent to shifted antenna slot 220A', may be used to estimate elevation bearing. For example, the better matched shifted antenna slot 220A' is to one or more of the adjacent antenna slots 220A, the better the elevation bearing estimate will be.

As previously mentioned, assembly 200 further comprises a TX section 217. TX section 217 also comprises a plurality of antenna slots 220B, a plurality of grooves 230B, and a plurality of "fake" or mimicking grooves 222B, which, as mentioned, may be configured to match or at least substantially resemble the antenna slots 220B, preferably in both length and width but most preferably in at least width, but without extending all the way through the structure into which they are formed, unlike the antenna slots 220B.

In the depicted embodiment, there are three TX antenna slots 220B, each of which has a pair of adjacent grooves 230B adjacent thereto, one on either side. In addition, a single mimicking groove 222B is positioned at each opposing end of the outermost, single grooves 230B previously mentioned. These grooves 222B mimic/match the antenna slots 220B, again, without extending all the way through the structure into which they are formed. Thus, it may be desirable to include at least one peripheral mimicking groove 222B on or adjacent to each opposing end of the outermost antenna slots 220B of TX section 217 and/or of TX section 217 itself. It should be understood that more than one isolation groove may be positioned adjacent and/or on either side of each antenna slots 220B, if desired.

In addition, an array of additional grooves 230B is positioned on the opposing outermost edges of the opposing mimicking grooves 222B. The array of grooves 230B to the left, which is in between TX section 217 and RX section 215, may be considered a part of either section. Four grooves 230B are positioned on the right side of TX section 217, thereby delineating the outermost edge of this functional section, whereas three grooves 230B are positioned on the left side in between TX section 217 and RX section 215, thereby again either being considered an intermediate section or a functional part of either of these sections.

TX grooves 230B are preferably not as deep as the RX isolation grooves.

These TX grooves may be used to manipulate the interaction between adjacent slots and shape the azimuth pattern. Their depth may be adjusted to adjust the interaction between antennas in a way that optimizes the pattern. They may function as delay elements or additional scatterers.

Although not visible in FIG. 3, in some embodiments, one or more of the various grooves 230B (and/or isolation grooves 230A) may have a different depth from one or more of the other isolation grooves. For example, in some embodiments, shallower grooves may be interspersed throughout assembly 200, or any of the other embodiments depicted and/or described herein. In some such embodiments, the shallower grooves may be primarily, or exclusively, found in the TX section 217.

For example, in a particular contemplated embodiment, each of the single grooves 230B immediately adjacent to an antenna slot 220B may be shallower than some, most, or all of the other isolation grooves. In addition, one (or, in other contemplated embodiments, a plurality) of grooves 230B of an array on one or both outer ends of TX section 217 may be shallower than the other grooves 230B in such arrays and/or shallower than the isolation grooves 230A in RX section 215. Preferably, the shallower isolation grooves 230A in these arrays consist of only the innermost isolation grooves 230A. For example, in the embodiment of FIG. 2, only the single, innermost isolation groove 230A in each of the outermost arrays adjacent and outside of the fake/slot mimicking grooves 222B may be shallower than the others. These shallower grooves may be, in preferred embodiments, between about 20% and about 60% less deep than the other grooves. Thus, in an embodiment in which the deeper grooves are about 0.75 mm deep, the shallower grooves may be about 0.5 mm deep. These differences in depth are visible in the cross-sectional view of FIG. 4.

Figure 4:
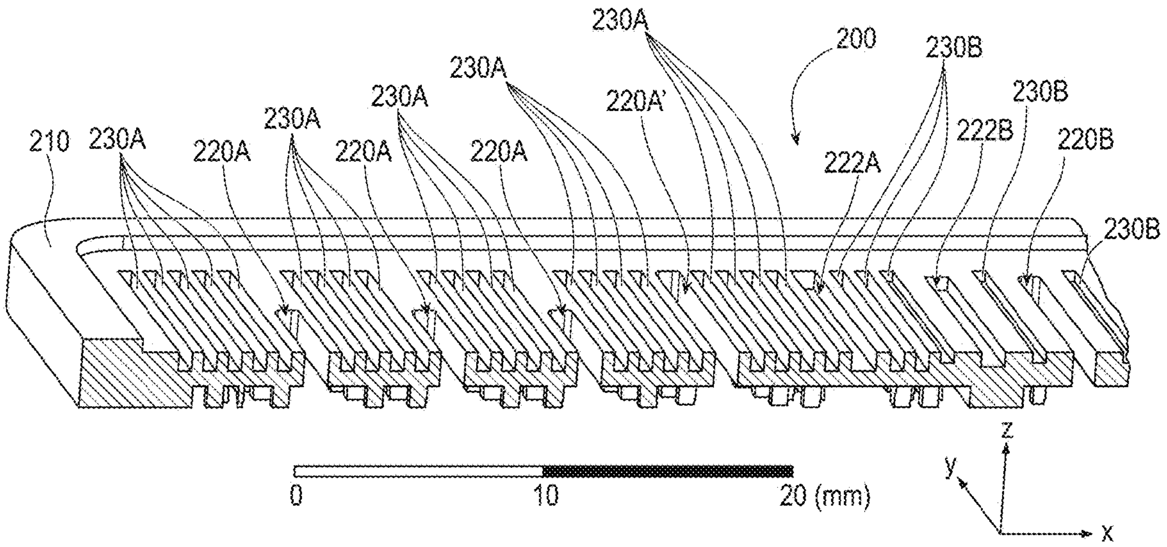
FIG. 4 is a cross-sectional view taken through the RX section of the antenna module of FIG. 3.

FIG. 4 further illustrates the waveguide structures formed on the opposite surface (lower)/side of the assembly 200. Although the distance scale shown in FIG. 4 may be useful for certain preferred embodiments and should be considered applicable to FIG. 5 as well, it should be understood that the distances shown may vary widely in accordance with the field and preferred features of a particular application.

Figure 5:
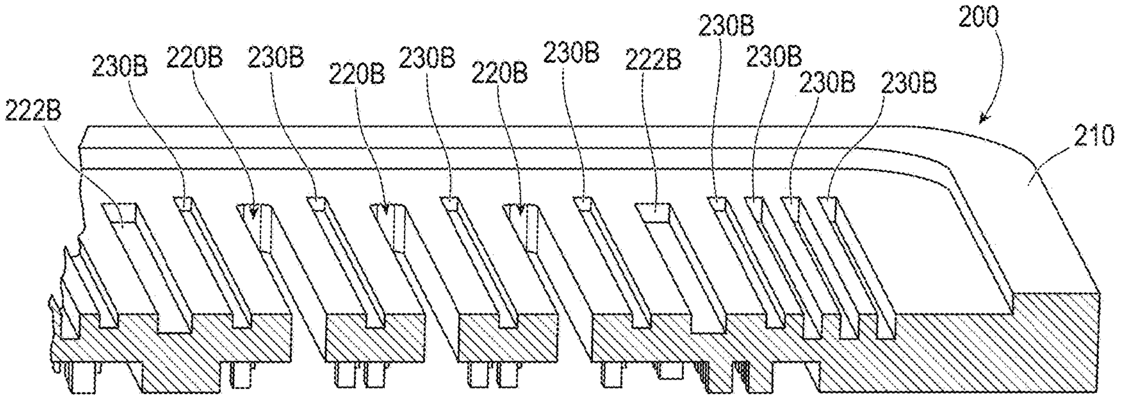
FIG. 5 is a cross-sectional view taken through the TX section of the antenna module of FIG. 3.

FIG. 5 is another cross-sectional view of another embodiment taken from the opposite side of assembly 200 with respect to that of FIG. 4 and therefore primarily depicts the structures and features of the TX section 217 of the assembly 200. This figure therefore better illustrates the relative depths and positioning of the various grooves and slots of the TX section 217, including grooves 230B, the antenna slots 220B, and the fake/slot mimicking grooves 222B.

As best seen in this figure, some of the grooves 230B may be deeper than others. Thus, the three outermost grooves 230B are substantially deeper than the grooves 230B positioned in between adjacent antenna slots 220B and those between a fake/slot mimicking groove 222B and an antenna slot 220B. These grooves 230B may therefore be considered isolation grooves. In addition, one of the grooves 230B in the outermost array of grooves 230B (the innermost groove 230B) is also substantially shallower than the rest of the grooves 230B in this array. It should be understood, however, that in alternative embodiments, more than one of the isolation grooves in these boundary arrays (whether forming the boundary of the assembly and/or a functional section of the assembly, such as between the RX and TX sections) may be shallower. For example, two (preferably inner) grooves 230B may be shallow and three (or more; preferably outer) grooves 230B in one or more of the arrays may be deeper. Preferably, however, the number of deeper grooves in these boundary arrays is greater than the number of shallower grooves and preferably the deeper grooves are positioned outside of the shallower grooves.

In this particular embodiment, for the TX section the shallow grooves may function as tuning elements that adjust the interaction between antennas in a favorable way, so that broad patterns may be produced, whereas the outer grooves 230B that are deep may be configured to isolate the TX antennas from their surroundings (RX antennas and/or the edge of the housing and/or assembly).

Figure 6:
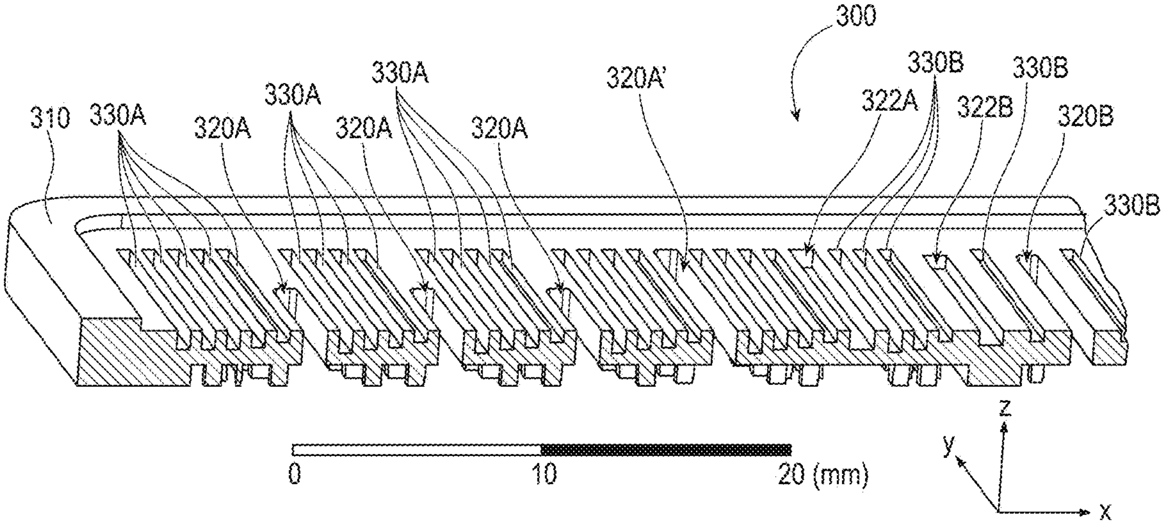
FIG. 6 is a cross-sectional view of an alternative RX section of the antenna module of FIG. 3 in which the isolation grooves vary in depth.

FIG. 6 presents a view of an alternative embodiment of a waveguide/antenna/sensor assembly 300. This embodiment is similar to assembly 200, and the view of FIG. 6 is the same as the view of assembly 200 shown in FIG. 4. Thus, assembly 300 again comprises a body 310, which may comprise a casting, layer, or the like. Assembly 300 may further comprise an RX section and a TX section (although in this view it is primarily the RX section being shown).

As with assembly 200, the RX section of assembly 300 comprises four antenna slots 320A. Each of the four antenna slots 320A has essentially the same shape—i.e., the same length and width. However, three of the antenna slots 320A are aligned with one another—i.e., they begin and end at the same points along the structure into which they are formed—and the last of the antenna slots (antenna slot 320A') is shifted vertically to be aligned, at least at its upper end, with the adjacent isolation grooves 330A.

However, unlike assembly 200, the isolation grooves 330A are formed so as to intentionally vary in depth. More particularly, isolation grooves 330A are formed in arrays, some of which contain isolation grooves 330A that vary in a stepwise manner from one side of each array to the other. Thus, whereas the outermost array of isolation grooves 330A on the left side of assembly 310 contains three relatively deeper grooves 330A on the outer edge of the array and two progressively shallower grooves 330A, each of the other arrays contains isolation grooves 330A that each varies from one another. In the depicted embodiment, the leftmost isolation groove 330A of each array is the deepest, the rightmost isolation groove 330A is most shallow, and the isolation grooves 330A in between progressively decrease in depth from left to right, as shown in FIG. 6.

By varying their depth, grooves 330A may be used for two purposes at once. In particular, grooves 330A may be used to shape the antenna pattern (or squint) and also provide isolation between RX antennae. This may be used to create an intentional skew in the groove depths that, in turn, results in a corresponding skew in the antenna pattern.

Other features of assembly 300 may be similar to those previously mentioned, including providing one or more fake/slot mimicking grooves 322A/322B (and/or auxiliary slots), isolation grooves 330B on the TX section/side of the assembly 300, and TX antenna slots 320B. Again, it should be understood that these inventive principles may, in combination with the knowledge of those of ordinary skill in the art, result in a wide variety of alternative features and embodiments. In addition, although the distance scale shown in FIG. 6 may be useful for certain preferred embodiments, it should be understood that the distances shown, including for purposes of the depths of various grooves and spacing between various functional elements, may vary widely in accordance with the field and preferred features of a particular application.

Figure 7:
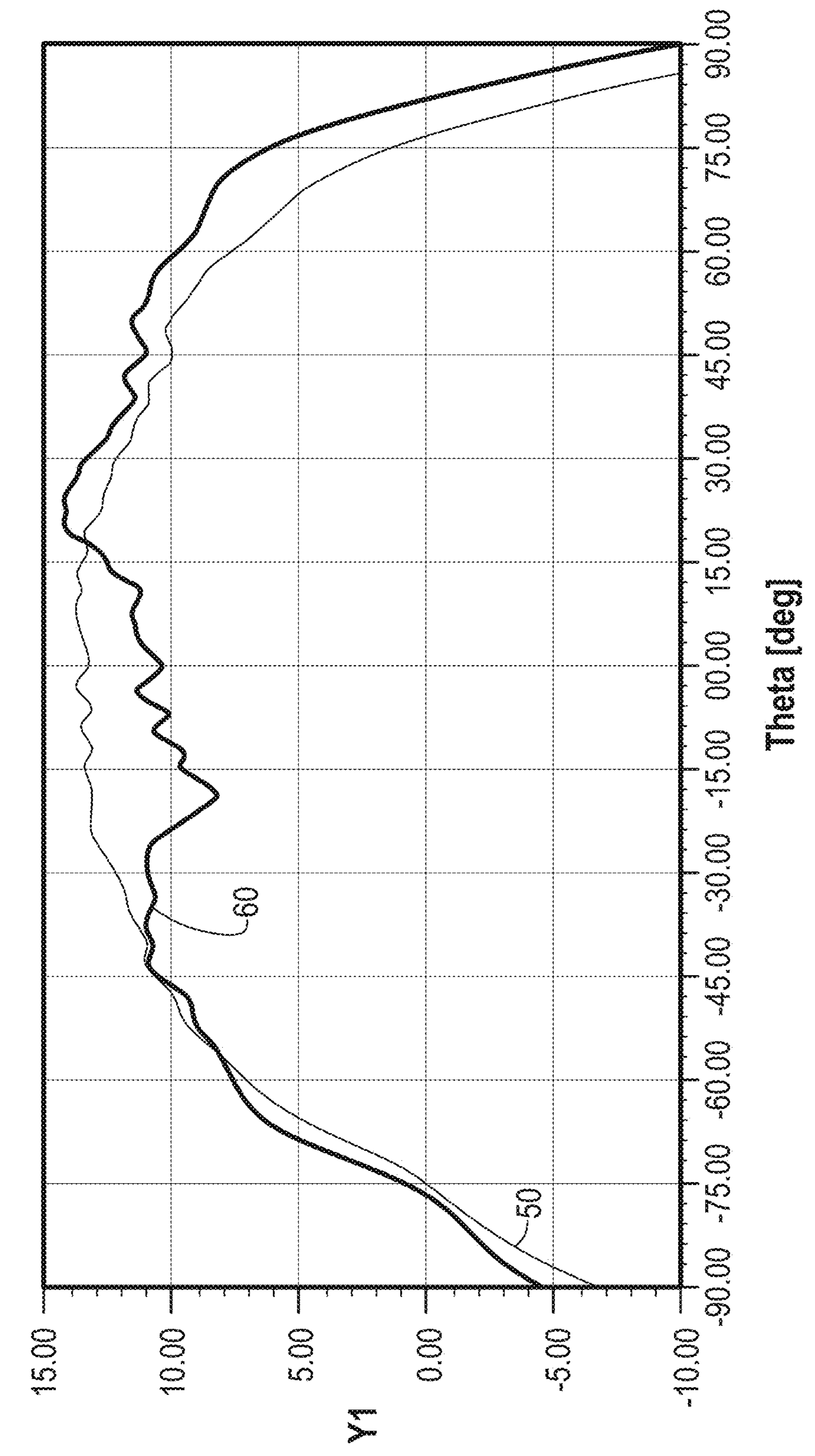
FIG. 7 is a graph comparing the signal strength per angle for the embodiment of FIG. 5 vs. the embodiment of FIG. 6.

FIG. 7 is a graph illustrating how the use of varying isolation groove depths, as taught herein, may be useful to increase signal strength at one or more preferred angles. The graph of FIG. 7 includes a line 50 that represents the signal strength (y axis) at particular angles (x axis) for the assembly 200 depicted in FIGS. 3-5). FIG. 7 also includes, for purposes of comparison, another line 60 that represents the signal strength at each angle for the assembly 300 having variability in the depth of the isolation grooves 330A, as discussed above. As demonstrated by comparing lines 50 and 60, a substantial boost in signal strength can be obtained by the variable-depth isolation grooves at certain angles, such as, for example, particularly the region between about 45 degrees and about 75 degrees.

Figure 8:
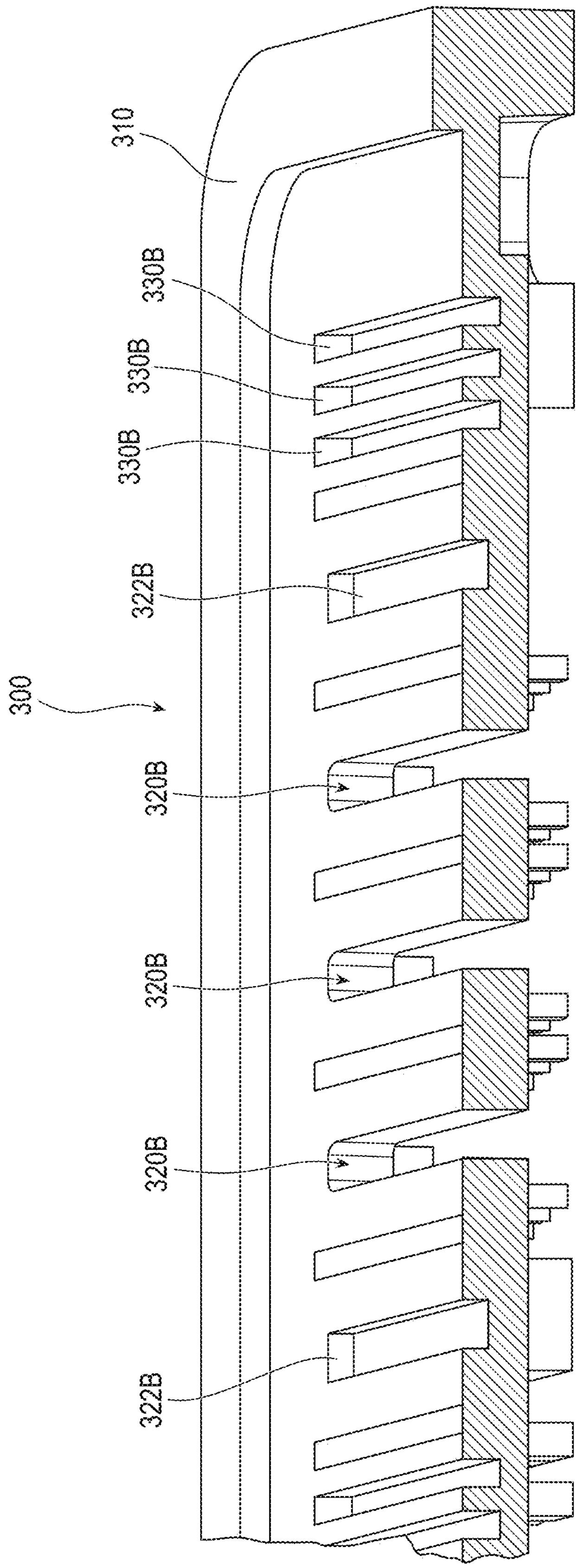
FIG. 8 is a cross-sectional view of an alternative TX section of the antenna module of FIG. 5.

FIG. 8 is another cross-sectional view of another embodiment, which may be the same embodiment as FIG. 6, taken from the opposite side of assembly 300 with respect to that of FIG. 6. Of course, this section, or one or more features thereof, may be combined with the features of any other embodiment taught or suggested herein. Thus, for example, the features of FIG. 8 may be combined with the RX section 215 of assembly 200 and/or one or more features thereof, instead of from assembly 300 if desired.

FIG. 8 primarily depicts the structures and features of the TX section of the assembly 300. This figure therefore better illustrates the relative depths and positioning of the various grooves and slots of the TX section, including the isolation grooves 330B, the antenna slots 320B, and the fake/slot mimicking grooves 322B. However, unlike the TX section of assembly 200, the TX section depicted in FIG. 8 has the isolation grooves that were positioned in between each pair of adjacent antenna slots removed, along with the boundary isolation grooves that were, in the embodiment of FIG. 5, positioned in between the slot-mimicking grooves 222B and the antenna slots 220B. Finally, one of the shallow isolation grooves in the boundary array has also been removed. It should be noted that these removed grooves are outlined, even though not technically present, in the drawings for purposes of comparison with other embodiments.

Thus, the TX section depicted in FIG. 8 comprises three antenna slots 320B, two opposing slot-mimicking grooves 322B (one on each end of the array of antenna slots 320B), and opposing arrays of isolation grooves 330B. Again, one or more of the slot-mimicking grooves may be replaced with a similar auxiliary slot instead, if desired.

Figure 9:
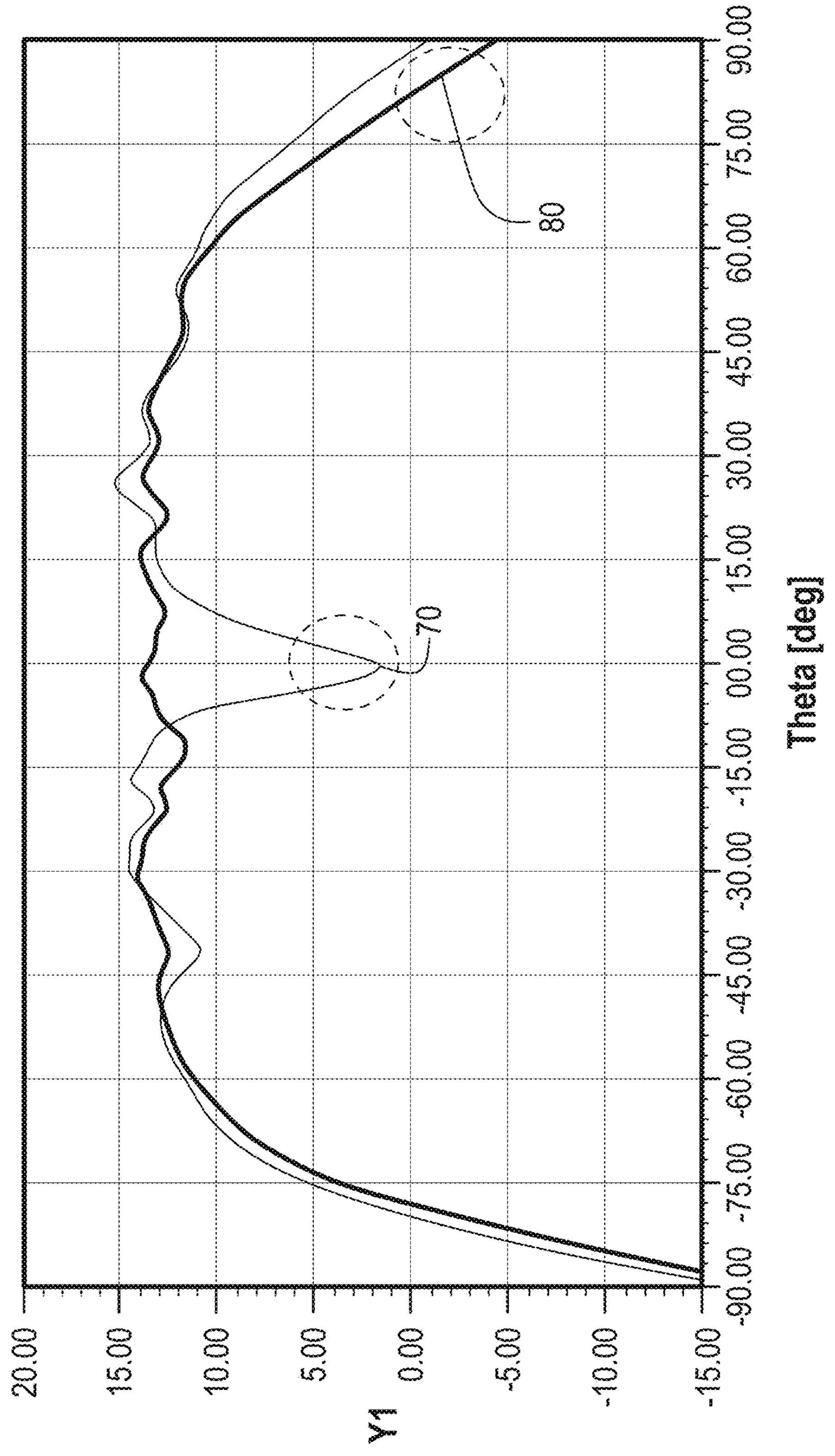
FIG. 9 is a graph comparing the signal strength per angle for the embodiment of FIG. 5 vs. the embodiment of FIG. 8.

FIG. 9 is a graph illustrating how the removal and/or addition of certain isolation grooves, as taught herein, may be useful to increase signal strength at one or more preferred angles. The graph of FIG. 9 includes a line 70 that represents the signal strength (y axis) at particular angles (x axis) for the assembly 300 depicted in FIG. 8 in which certain isolation grooves have been removed, as discussed above. FIG. 7 also includes, for purposes of comparison, another line 80 that represents the signal strength at each angle for the assembly 200 having isolation grooves in between each adjacent pair of antenna slots, and additional isolation grooves, as also discussed above. As demonstrated by comparing lines 70 and 80, a substantial boost in signal strength at certain angles can be obtained by removing certain isolation grooves. Thus, as shown in FIG. 9, and particularly the two circled regions of FIG. 9, by sacrificing signal strength at a boresight direction (zero degrees), an increase in signal strength can be achieved at higher angles, particularly those between about 75 and about 90 degrees.

Figure 10:
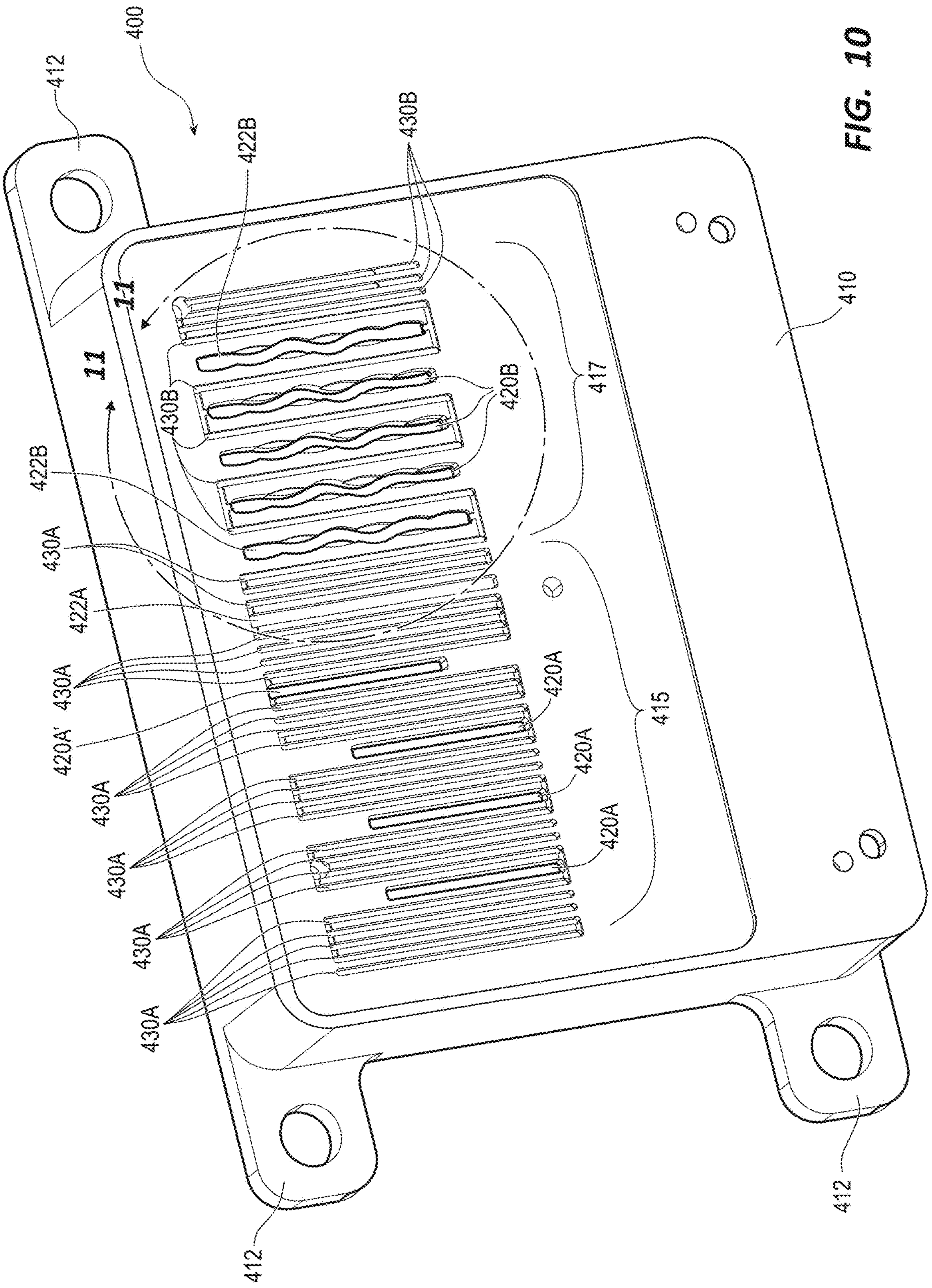
FIG. 10 is a perspective view of yet another example of an antenna module according to still other embodiments.

FIG. 10 depicts yet another embodiment of a waveguide/antenna/sensor assembly 400. Assembly 400 comprises various antenna slots and grooves, as previously mentioned. In addition, assembly 400 further comprises one or more antenna grooves, wherein each of the one or more antenna grooves is positioned adjacent to at least one of the one or more antenna slots, wherein each of the one or more antenna grooves (or, in alternative embodiments, auxiliary slots) that are designed to resemble one or more of the antenna slots but without extending all the way through the structure in which they are formed similar to the antenna slots.

More particularly, assembly 400 comprises a body 410, which may comprise a casting, layer, or the like, from which mounting tabs 412 protrude, which may allow for mounting of assembly 400 to a suitable location on a vehicle, for example.

Assembly 400 further comprises an RX section 415 and a TX section 417. RX section 415 may be similar or identical to RX section 215 of assembly 200. Thus, RX section 415 comprises four antenna slots 420A, each of which may have essentially the same shape—i.e., the same length and width. However, three of the antenna slots 420A are aligned with one another—i.e., they begin and end at the same points along the structure into which they are formed—and the last of the antenna slots (420A') is shifted vertically.

An array of isolation grooves 430A is positioned adjacent to each antenna slot 420A and in between each pair of adjacent antenna slots 420A. In the depicted embodiment, five isolation grooves 430A are positioned on the outer edge of RX section 415 on the left side of the figure, after which four isolation grooves 430A are positioned in between each pair of adjacent antenna slots 420A thereafter. As those of ordinary skill in the art will appreciate, the number of isolation grooves 430A used may vary according to the desired results but, as shown in the depicted embodiment, a larger number of isolation grooves 430A may be used in portions of the assembly 400 that delimit or are adjacent to boundaries, such as exterior boundaries of the assembly 400 and/or boundaries between different functional portions of the assembly 400.

It is also worth noting that the isolation grooves 430A are longer and thinner than the antenna slots 420A. Moreover, the first three (from the perspective of FIG. 10 starting at the left side of the figure) antenna slots 420A are aligned with the lower ends of the adjacent array(s) of isolation grooves 430A and the fourth antenna slot 420A' is aligned with the upper end of the adjacent arrays of isolation grooves 430A.

Grooves 430A arranged into relatively dense arrays, as shown in FIG. 10, may be useful to help isolate the adjacent antennae from one another and/or improve bearing estimation for both azimuth and elevation. These grooves may also be configured to reduce ripple in azimuth patterns, as discussed above. In some embodiments, isolation grooves 430A may be between about 0.4 mm and about 1.0 mm wide and may be between about 0.7 mm and about 1.0 mm deep. In a particular, preferred embodiment, the isolation grooves may be about 0.5 mm wide and about 0.75 mm deep.

Although from the perspective view of FIG. 10, groove 422A appears similar to antenna slots 420A and 420A', it should be understood that, unlike these antenna slots 420A/420A', groove 422A does not form an opening that extends all the way through the structure/layer into which each of these features is formed. Thus, this groove 422A should be considered to resemble or mimic the antenna slots 420A and 420A' without actually comprising a slot. Groove 422A may therefore be considered a “fake slot” or an “antenna slot mimicking groove” which may, in some cases along with the aforementioned isolation grooves, be used to better match the shifted antenna slot 420A' to its adjacent antenna slot 420A. Again, alternatively, one or more of the “fake slots” or an “antenna slot mimicking grooves” may be replaced with one or more auxiliary slots.

In addition, comparing detections received from the shifted antenna slot 420A' to detections from other antenna slots 420A, such as the antenna slot 420A adjacent to shifted antenna slot 420A', can be used to estimate elevation bearing. For example, the better matched shifted antenna slot 420A' is to one or more of the adjacent antenna slots 420A, the better the elevation bearing estimate will be.

Assembly 400 further comprises a TX section 417. TX section 417 also comprises a plurality of antenna slots 420B, a plurality of grooves 430B, and a pair of “fake” or mimicking grooves 422B, which, as mentioned, may be configured to match or at least substantially resemble the antenna slots 420B, preferably in both length and width but most preferably in at least width, but without extending all the way through the structure into which they are formed, unlike the antenna slots 420B.

In the depicted embodiment, there are three TX antenna slots 420B, each of which has a pair of adjacent grooves 430B adjacent thereto, one on either side. In addition, a single mimicking groove 422B is positioned at each opposing end of the outermost, single isolation grooves 430B previously mentioned. These grooves 422B mimic/match the antenna slots 420B, again, without extending all the way through the structure into which they are formed. It should be understood that more than one isolation groove may be positioned adjacent and/or on either side of each antenna slots 420B, if desired.

Figure 12:
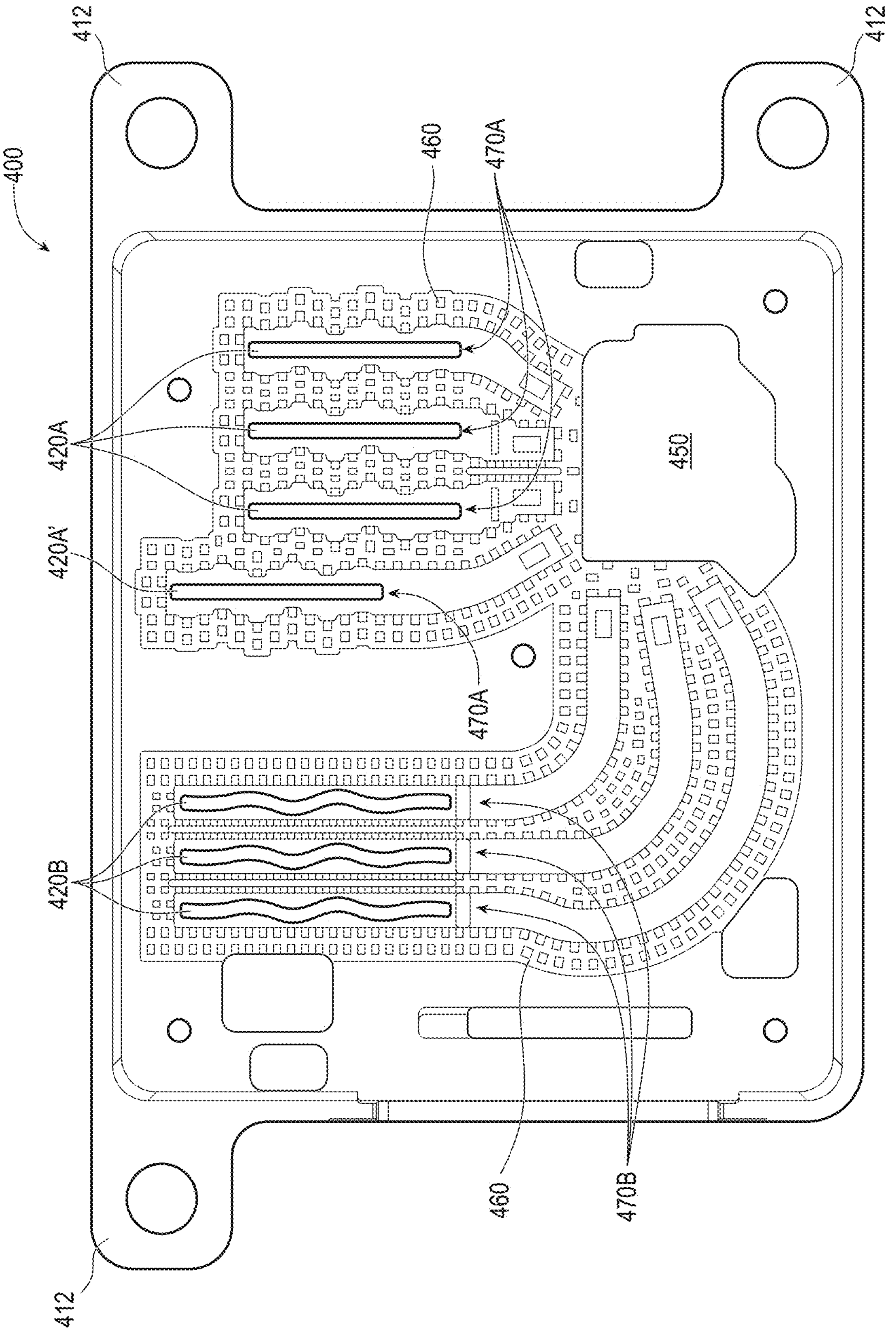
FIG. 12 is a plan view of the antenna module of FIG. 10 showing the side opposite from that shown in FIG. 10.

Unlike the antenna slots and fake/antenna slot mimicking grooves previously mentioned, however, antenna slots 420B are curved or “wavy.” More particularly, slots 420B and, because they are intended to mimic slots 420B, grooves 422B as well, oscillate back and forth between opposing sides of an elongated axis. As shown in FIG. 12, which depicts the opposite side of assembly 400, slots 420B are also positioned directly above respective waveguide grooves 470B. Any of the mimicking grooves, such as grooves 422B, may be replaced with auxiliary slots instead that may similarly mimic the antenna slots in one or more aspects but, unlike grooves 422B, extend entirely through the structure into which they are formed.

Similar waveguide grooves 470A are formed in the depicted embodiment by opposing rows of posts 460 on the RX section 415 of the assembly 400 with antenna slots 420A centered therein.

It is contemplated that these waveguides may be formed in the same block/structure as the slots 420B or may be formed in separate structures, such as layers, in alternative embodiments. In the depicted embodiment, waveguide grooves 470B are formed between a plurality of rows of posts 460. However, in alternative embodiments, waveguides may be formed as “trench”-like waveguides defined by forming grooves defined by continuous opposing walls.

In the depicted embodiment, a single waveguide groove 470B is defined by two or more opposing rows of posts 460 on each side of each waveguide groove 470B. However, alternative embodiments are contemplated in which a single row of posts 460 on either side of each waveguide groove is used, or others in which more rows of posts 460 that are depicted in FIG. 12 are used.

In addition, although this need not be the case for other embodiments, in the depicted embodiment, each antenna slot 420B is centered, or at least substantially centered, with respect to adjacent groove 470B and oscillates towards the opposing walls defined by posts 460 in an intermittent manner.

Each antenna slot 420B and, due to the desire to mimic these antenna slots 420B, each groove 422B, further comprises a phase-compensating feature. In the depicted embodiment, this is accomplished by applying one or more angled and/or tapered sections, such as tapered grooves or cutouts, along the slots. Thus, the depicted embodiment illustrates a tapered and/or angled section/surface 421 that is formed along both opposing sidewalls defining each antenna slot 420B, along with each slot-mimicking groove 422B, at respective points of maxima for the oscillating pattern of the respective slot/groove.

Figure 11:
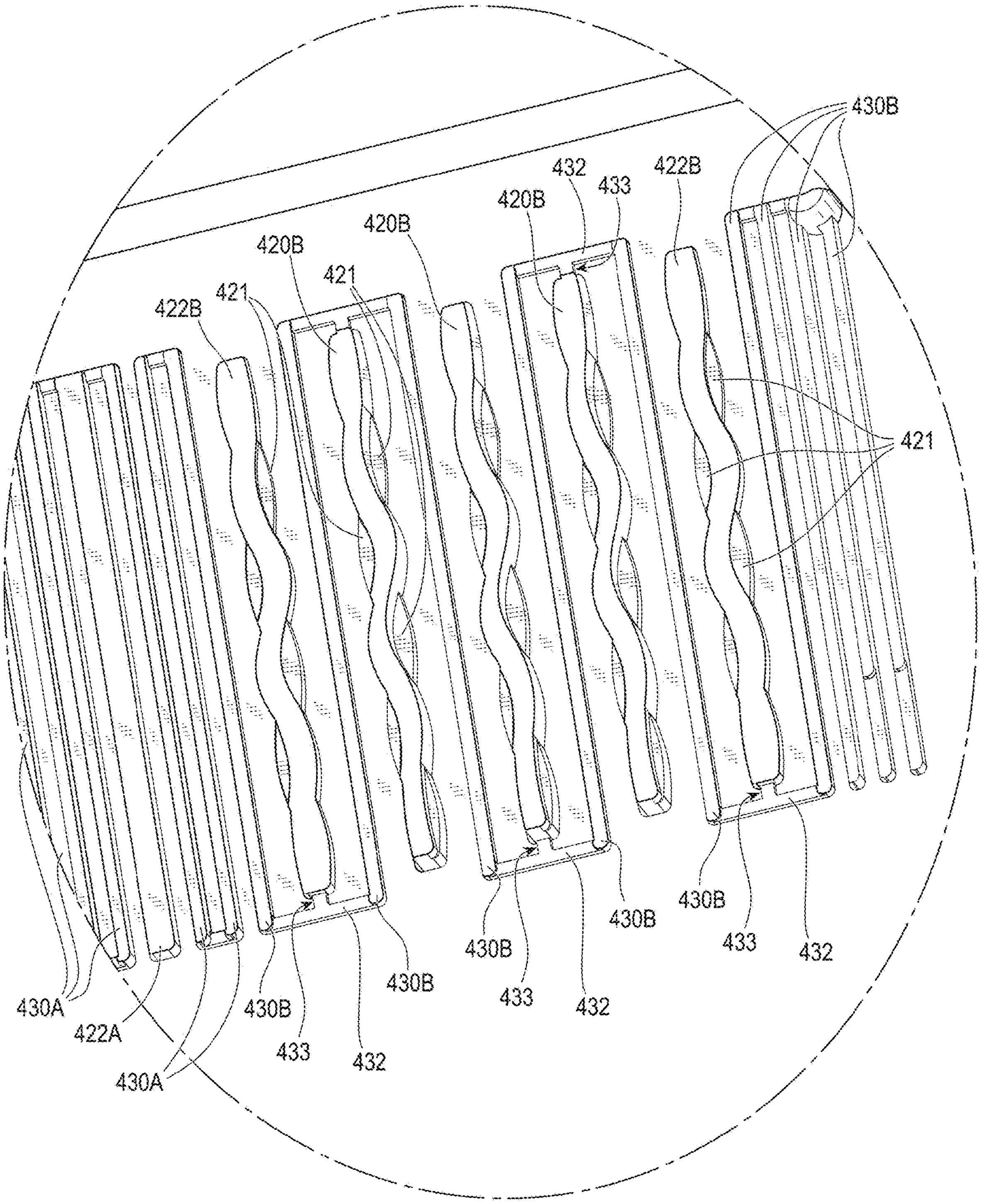
FIG. 11 is a close-up view of the TX section of the antenna module of FIG. 10.

These tapering sections 421 may comprise a stepped taper or ledge, as shown in FIG. 11, or may comprise a smoothly transitioning taper. In other words, a ledge may be formed at the starting point of the taper and therefore, rather than a smooth taper between the outer surface of the structure defining the slot/groove and the starting point of section 421, the transition of tapering section 421 may be immediate from the starting point, which is at a ledge of section 421 to the outer surface of the structure forming the slot/groove.

In some embodiments, all of the peaks/maxima of the oscillating pattern of slots 420B and/or grooves 422B may comprise a phase-compensating feature, such as a tapering section 421. Alternatively, in some embodiments, only a subset of the peaks/maxima defined by slots 420B and/or grooves 422B may comprise such a feature.

In addition, slots 420B and/or grooves 422B may intermittently oscillate on opposite sides of its respective elongated axis and/or adjacent waveguide (see FIG. 12) along at least a portion thereof. In some such embodiments, each of at least a subset of the plurality of the tapering surfaces/sections 421 may be spaced apart in a manner that coincides with the intermittent oscillation of the slots 420B and/or grooves 422B. In some such embodiments, all of the tapering surfaces/sections 421 may be spaced apart in a manner that coincides with the intermittent oscillation of the slots 420B and/or grooves 422B.

It should be understood, however, that the stepped taper of assembly 400 is but an example for purposes of illustration and that a wide variety of alternative embodiments are contemplated. For example, although only a single step is used in the tapered section 421 of assembly 400, any number of steps may be used in between the one step shown in this embodiment and an effectively infinite number of steps involved in a smooth taper.

Each of the tapering sections 421 of assembly 400 may comprise a stepped taper extending between a first edge of the ledge formed by tapering section 421, which first edge may be positioned in between the external surface of the structure forming slots 420B and/or grooves 422B and the internal surface of this structure, and a second edge of a concavely curved surface (in some cases, a semi-circular concavely curved surface), the second edge extending along the external surface of the aforementioned structure. Again, any number of intermediate steps may be used as desired.

In preferred embodiments, these sections/surfaces 421 are positioned so as to alternate and be staggered along the opposing slot sidewalls such that each section 421 is positioned at a particular point along the axis of along only one sidewall of each respective slot 420B and/or groove 422B, as best seen in FIG. 11. In addition, even more preferably, each section 421 is formed along one of the peaks of each oscillating respective slot 420B and/or groove 422B. Thus, for example, if the slot defines, or at least substantially defines, a sine wave, each of the sections 421 is preferably formed along one of the peaks of the sine wave extending towards the axial center of the slot 420B and/or accompanying waveguide 470B.

In some embodiments, all of the aforementioned peaks may comprise a phase-compensating feature, such as a tapering section 421. Alternatively, only a subset of the peaks defined by each respective slot 420B and/or groove 422B may comprise such a feature.

In some embodiments, each respective slot 420B and/or groove 422B may intermittently oscillate on opposite sides of the elongated axis of each respective slot 420B, groove 422B, and/or adjacent waveguide 470B along at least a portion thereof. In some such embodiments, each of at least a subset of the plurality of the tapering surfaces/sections 421 may be spaced apart in a manner that coincides with the intermittent oscillation of each respective slot 420B and/or groove 422B. In some such embodiments, all of the tapering surfaces/sections 421 may be spaced apart in a manner that coincides with the intermittent oscillation of each respective slot 420B and/or groove 422B.

Thus, for example, in some embodiments, each of the plurality of tapering sections surfaces 421 may comprise a first set of tapering surfaces on a first side of each respective slot 420B and/or groove 422B and a second set of tapering surfaces 421 on a second side of each respective slot 420B and/or groove 422B opposite the first side. Preferably, the tapering surfaces/sections 421 alternate such that each tapering surface of first set of tapering surfaces is positioned adjacent to one or more tapering surfaces of the second set of tapering surfaces along the axis of each respective slot 420B and/or groove 422B and each tapering surface of the second set of tapering surfaces is positioned adjacent to one or more tapering surfaces of the first set of tapering surfaces along the axis, again, preferably alternating back and forth across each respective slot 420B and/or groove 422B.

Each of the plurality of tapering surfaces/sections 421 may comprise a curved, tapering surface, as shown in FIG. 12. Indeed, in the depicted embodiment, each of the tapering surfaces/sections 421 is defined, at least in part, by a semi-circular cutout, which may be formed at the exterior surface of each respective slot 420B and/or groove 422B, as a concave region from the convex region of the curve defined by each respective slot 420B and/or groove 422B, and then may taper down to a corner, edge, or starting point of the taper. Thus, preferably, the tapers of sections 421 do not extend all the way between opposing surfaces of the structure of assembly 400 defining slots 420B, but rather start at a point between the opposing surfaces of this structure and extend to the upper/outer portion of slots 420B on the side opposite the aforementioned waveguides 470B.

However, in embodiments in which one or more of the tapering sections 421 has a starting point between opposing surfaces of the structure defining the slot(s) 420B, it may be desirable from a manufacturing standpoint that the starting point(s) of the tapering sections 421 be sufficiently spaced from the (typically inner) surface from which the slot(s) 420B originates. Thus, in some embodiments, the starting point may be located at a point no less than 20%, or no less than about 20%, of the distance from the lower/inner and/or originating surface of the slot(s) to the upper/outer and/or terminating surface of the slot(s).

As discussed below in connection with later figures, other embodiments are contemplated in which the tapering surfaces/sections 421 may instead be straight or non-curved. In addition, in some embodiments, the curvature of the tapering sections 421 may extend in multiple dimensions. In other words, a semi-spherically curved surface may be formed within one or more of these sections 421 if desired. Additional details regarding these phase-compensating features can be found in U.S. patent application Ser. No. 17/370,922 titled PHASE-COMPENSATED WAVEGUIDES AND RELATED SENSOR ASSEMBLIES, the entire contents of which are hereby incorporated by reference herein.

As further illustrated best by FIG. 11, grooves 430B may, in some embodiments, include one or more portions that extend perpendicular to the elongated axis of slots 420B and/or grooves 422B, such as groove portions 432, which extend at one or both opposing ends of grooves 432B. In addition, a portion of one or more grooves 432B may extend into one or both ends of one or more of the slots 420B and/or grooves 422B, as shown at 433.

This may be desired for certain applications and/or embodiments to allow all of the grooves and/or slots to be connected together for venting purposes. In other words, this may allow for connection of the air in the grooves and/or slots to the air in the housing of the assembly, which may prevent or at least inhibit pressure build up when the air heats up. If the grooves were not connected to the slots by these channels, then the air may become trapped in the grooves, which may expand and push the radome of the assembly (in embodiments in which the assembly is used for a vehicle RADAR sensor, for example) away.

Other features of TX section 417 may be similar to other TX sections previously discussed. Thus, an array of additional grooves 430B may be positioned on the opposing outermost edges of the opposing mimicking grooves 422B. Such grooves 430B may, or may not, comprise interconnecting groove sections for venting, as previously discussed.

The array of grooves 430A to the left, which is in between TX section 417 and RX section 415, may be considered a part of either section. Four grooves 430B are positioned on the right side of TX section 417, thereby delineating the outermost edge of this functional section, whereas three grooves 430A are positioned on the left side in between TX section 417 and RX section 415, thereby again either being considered an intermediate section or a functional part of either of these sections.

As mentioned above, although not visible in FIG. 10 or 11, in some embodiments, one or more of the various grooves 430B (and/or isolation grooves 430A) may have a different depth from one or more of the other grooves. For example, in some embodiments, shallower grooves may be interspersed throughout assembly 400, or any of the other embodiments depicted and/or described herein. In some such embodiments, the shallower grooves may be primarily, or exclusively, found in the TX section 417.

For example, in a particular contemplated embodiment, each of the single grooves 430B immediately adjacent to an antenna slot 420B may be shallower than some, most, or all of the other grooves. In addition, one (or, in other contemplated embodiments, a plurality) of isolation grooves 430B of an array on one or both outer ends of TX section 417 may be shallower than the other grooves 430B in such arrays and/or shallower than the isolation grooves 430A in RX section 415. Preferably, the shallower isolation grooves 430A in these arrays consist of only the innermost isolation grooves 430A.

Additional elements of assembly 400 can be seen in the opposite plan view of FIG. 12. For example, in addition to the waveguides 470A and 470B created by the aforementioned rows of posts 460, FIG. 12 depicts a hub region 450 from which each of these waveguides initiates and/or terminates to allow for sending and receiving of electromagnetic signals. It should be understood that hub region 450 would typically include various electrical components, such as electromagnetic generation chips or other elements, that are not shown in the figures to avoid obscuring the disclosure. A suitable electromagnetic feed or transition structure may also be used to facilitate transitioning electromagnetic waves/signals to the waveguide grooves as needed.

It should also be understood that alternative embodiments are contemplated in which the slots 420B and/or grooves 422B oscillate in a non-smooth manner. For example, slots 420B and/or grooves 422B may define, or at least substantially define, a square wave in some contemplated embodiments.

In addition, the taper of sections 421 may extend the entire distance between the upper and lower surfaces of the portion/layer/structure defining the slots 420B and/or grooves 422B. Or, alternatively, the taper may start/stop at a particular point in between these two surfaces.

Various other alternative features/embodiments are also contemplated. For example, in some embodiments, a series of spaced slots may be provided rather than a single, elongated slot, for a given waveguide. Such spaced slots may, but need not, oscillate. In addition, the aforementioned tapered/angled sections/surfaces may be formed in some or all such spaced slots. For example, in some embodiments, the tapering sections may be formed in every slot but may alternate on sides such that every other slot and/or groove has a cutout/tapering section formed on an opposite side relative to the adjacent slot(s) and/or groove(s). In addition, arrays of grooves may be formed that resemble or mimic, in one aspect or more, the oscillation of the slots, rather than providing straight grooves, such as grooves 430B, for example.

As those of ordinary skill in the art will appreciate, antenna/waveguide/sensor assemblies incorporating the waveguide/antenna structures described herein may further comprise a PCB or other electromagnetic-generating element from which electromagnetic waves may be generated to feed one or more waveguide structures. These elements may be provided in a separate layer or, alternatively, may be provided in the same layer.

It should also be understood that, whereas the block structures shown in the accompanying figures are generally shown with a single groove, which may be thought of as providing a single "antenna" when coupled with one or more adjacent slots, any number of waveguide grooves and/or adjacent slot and/or antenna structures may be provided as desired, and each such waveguide and/or waveguide groove may be associated with a different antenna of the antenna block/assembly.

It should also be understood that whereas preferred embodiments may be used in connection with vehicle sensors, such as vehicle RADAR modules or the like, the principles disclosed herein may be used in a wide variety of other contexts, such as other types of RADAR assemblies, including such assemblies used in aviation, maritime, scientific applications, military, and electronic warfare. Other examples include point-to-point wireless links, satellite communication antennas, other wireless technologies, such as 5G wireless, and high-frequency test and scientific instrumentation. Thus, the principles disclosed herein may be applied to any desired communication sub-system and/or high-performance sensing and/or imaging systems, including medical imaging, security imaging and stand-off detection, automotive and airborne radar and enhanced passive radiometers for earth observation and climate monitoring from space.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. An antenna assembly, comprising:

an antenna slot array comprising a plurality of antenna slots extending between opposing surfaces of the antenna assembly, wherein either: (1) each of the plurality of antenna slots in the antenna slot array is part of a transmit section of the antenna assembly; or (2) each of the plurality of antenna slots in the antenna slot array is part of a receive section of the antenna assembly; and an isolation groove array comprising a plurality of isolation grooves, wherein the isolation groove array comprises a plurality of isolation grooves positioned between each adjacent antenna slot of the antenna slot array.

2. The antenna assembly of claim 1, wherein at least a subset of the isolation grooves in the isolation groove array comprises isolation grooves that are longer than any of the antenna slots in the antenna slot array.

3. The antenna assembly of claim 2, wherein each of the isolation grooves in the isolation groove array is longer than any of the antenna slots in the antenna slot array.

4. The antenna assembly of claim 1, wherein at least a subset of the isolation grooves in the isolation groove array comprises isolation grooves that are thinner than any of the antenna slots in the antenna slot array.

5. The antenna assembly of claim 4, wherein each of the isolation grooves in the isolation groove array is thinner than any of the antenna slots in the antenna slot array.

6. The antenna assembly of claim 1, wherein at least one antenna slot in the antenna slot array comprises a shifted antenna slot that is shifted in a direction of an axis of the shifted antenna slot relative to other antenna slots in the antenna slot array.

7. The antenna assembly of claim 6, wherein an upper end of the shifted antenna slot is at least substantially aligned with respective upper ends of a plurality of adjacent isolation grooves, and wherein a lower end of an antenna slot adjacent to the shifted antenna slot is at least substantially aligned with respective lower ends of a plurality of adjacent isolation grooves.

8. The antenna assembly of claim 1, wherein the antenna assembly comprises a transmit section and a receive section, wherein the transmit section is configured to transmit electromagnetic signals therethrough, and wherein the receive section is configured to receive electromagnetic signals therethrough.

9. The antenna assembly of claim 8, wherein each of the plurality of antenna slots in the antenna slot array is part of the receive section.

10. The antenna assembly of claim 9, further comprising a second antenna slot array and a second isolation groove array.

11. The antenna assembly of claim 10, wherein the second isolation groove array comprises a plurality of isolation grooves positioned between the antenna slot array of the transmit section and the second antenna slot array of the receive section.

12. The antenna assembly of claim 10, wherein the second isolation groove array comprises a single isolation groove positioned between each adjacent antenna slot of the second antenna slot array.

13. The antenna assembly of claim 12, wherein each antenna slot of the second antenna slot array is part of the transmit section.

* * * * *